US012729631B2

(12) United States Patent
Schilling et al.

(10) Patent No.: US 12,729,631 B2
(45) Date of Patent: Sep. 8, 2026

(54) SHROUD HANGER ASSEMBLY

(71) Applicant: General Electric Company, Schenectady, NY (US)

(72) Inventors: Jan Christopher Schilling, Liberty Township, OH (US); Andrew John Breslin, West Chester, OH (US); Bryce Loring Heitman, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/971,470

(22) Filed: Dec. 6, 2024

(65) Prior Publication Data

US 2025/0101885 A1 Mar. 27, 2025

Related U.S. Application Data

(63) Continuation of application No. 18/398,597, filed on Dec. 28, 2023, now Pat. No. 12,196,099, which is a continuation of application No. 17/565,528, filed on Dec. 30, 2021, now Pat. No. 11,879,349, which is a continuation of application No. 16/462,355, filed as application No. PCT/US2015/029342 on May 6, 2015, now Pat. No. 11,215,081.

(60) Provisional application No. 62/011,237, filed on Jun. 12, 2014.

(51) Int. Cl.

| | |
|---|---|
| ***F01D 25/24*** | (2006.01) |
| *F01D 9/04* | (2006.01) |
| *F01D 11/12* | (2006.01) |

(52) U.S. Cl.

CPC .............. *F01D 25/246* (2013.01); *F01D 9/04* (2013.01); *F01D 11/12* (2013.01); *F05D 2240/11* (2013.01); *Y02T 50/60* (2013.01)

(58) Field of Classification Search

CPC .......... F01D 25/246; F01D 9/04; F01D 11/12; F05D 2240/11; Y02T 50/60

See application file for complete search history.

(56) References Cited

U.S. PATENT DOCUMENTS

| | | | |
|---|---|---|---|
| 4,596,116 A | 6/1986 | Mandet et al. | |
| 5,080,557 A | 1/1992 | Berger | |
| 5,092,735 A * | 3/1992 | Katy | F01D 11/08 415/115 |
| 5,197,853 A * | 3/1993 | Creevy | F01D 11/08 29/889.22 |
| 5,553,999 A * | 9/1996 | Proctor | F01D 25/246 415/173.1 |

(Continued)

FOREIGN PATENT DOCUMENTS

| | | | |
|---|---|---|---|
| FR | 2597921 A1 * | 10/1987 | F01D 11/12 |
| GB | 2484188 A | 4/2012 | |

(Continued)

*Primary Examiner* — Eldon T Brockman

(74) *Attorney, Agent, or Firm* — Dority & Manning, P.A.

(57) ABSTRACT

A shroud hanger assembly is provided for hangers and shrouds defining dimensionally incompatible components such as those which are press or frictionally fit to engage one another. The shroud hanger assembly includes a multi-piece hanger and a shroud that is pinned to the hanger assembly by at least one axially extending pin and which locates the shroud relative to the hanger to control motion in one or both of circumferential (tangential) and radial directions relative to the engine.

20 Claims, 9 Drawing Sheets

(56) References Cited

U.S. PATENT DOCUMENTS 6,406,256 B1 6/2002 Marx
6,733,235 B2 5/2004 Alford et al.
6,877,952 B2 4/2005 Wilson
6,884,026 B2 4/2005 Glynn et al.
7,044,709 B2 5/2006 Bruce et al.
7,278,820 B2 10/2007 Keller
7,494,317 B2 2/2009 Keller et al.
8,123,844 B2 2/2012 Buthmann et al.
8,206,085 B2 6/2012 Ammann
8,905,709 B2 12/2014 Dziech et al.
2004/0062639 A1 4/2004 Glynn et al.
2004/0071548 A1 4/2004 Wilson, Jr.
2006/0067815 A1* 3/2006 Ghasripoor .......... F04D 29/126 415/170.1
2006/0092001 A1 5/2006 Yokota et al.
2006/0292001 A1 12/2006 Keller et al.
2007/0077141 A1 4/2007 Keller
2008/0087021 A1 4/2008 Radonovich et al.
2008/0178465 A1 7/2008 Schiavo et al.
2012/0260670 A1 10/2012 Foster et al.
2013/0156556 A1* 6/2013 Franks ................. F01D 25/246 415/182.1
2013/0272870 A1 10/2013 Weber et al.
2014/0271147 A1 9/2014 Uskert et al.

FOREIGN PATENT DOCUMENTS

JP S59153903 A 9/1984
JP S5412006 A 1/1989
JP H11513773 A 11/1999
JP 2001/303907 A 10/2001
JP 2004/225698 A 8/2004
JP 2005/351265 A 12/2005
JP 2009/051533 A 3/2009
JP 2009/108855 A 5/2009
JP 2010216473 A 9/2010
JP 2012/140937 A 7/2012
JP 2017/524089 A 8/2017
JP 2017/530282 A 10/2017

* cited by examiner 836
874
835
838
839
840
832
834
833
870
858
870
857
859
840
850
874
837
859
839

SHROUD HANGER ASSEMBLY

CROSS-REFERENCE TO RELATED APPLICATIONS

The present application is a continuation of U.S. application Ser. No. 18/398,597, filed Dec. 28, 2023, which is a continuation of U.S. application Ser. No. 17/565,528, filed Dec. 30, 2021, which is a continuation of U.S. application Ser. No. 16/462,355, filed May 20, 2019, which claims priority to PCT Application Serial No. PCT/US2015/029342, filed on May 6, 2015, which claims the benefit of U.S. Provisional Patent Application Ser. No. 62/011,237 titled "Shroud Hanger Assembly" of Jan Christopher Schilling, et. al., filed on Jun. 12, 2014, all of which are incorporated by reference herein.

STATEMENT REGARDING FEDERALLY SPONSORED RESEARCH

None.

TECHNICAL FIELD

The present embodiments relate to a shroud hanger assembly for use in a gas turbine engine. More specifically, present embodiments relate to, without limitation, a shroud hanger assembly having at least one locating pin for alignment of the shroud relative to a hanger assembly.

BACKGROUND

A gas turbine engine includes a turbomachinery core having a high pressure compressor, combustor, and high pressure turbine ("HPT") in serial flow relationship. The core is operable in a known manner to generate a primary gas flow. The high pressure turbine includes annular arrays ("rows") of stationary vanes or nozzles that direct the gases exiting the combustor into rotating blades or buckets. Collectively one row of nozzles and one row of blades make up a "stage". Typically two or more stages are used in serial flow relationship. These components operate in an extremely high temperature environment, and must be cooled by air flow to ensure adequate service life.

Due to operating temperatures within the primary flowpath of the gas turbine engine, it is desirable to utilize materials that have high temperature capability and do not require large amounts of cooling air. The higher operating temperatures within the engine improve the engine cycle thermal efficiency if the air used to cool the flowpath parts can be reduced. For example, to operate efficiently in such strenuous temperature and pressure conditions, composite materials have been suggested due to their superior temperature capability over metallic materials. In particular, ceramic matrix composite (CMC) materials are an ideal material for high temperature flowpath applications. Although CMC materials have higher temperature capability they have a lower coefficient of thermal expansion than the metallic alloys which are used to support the CMC components and create sealing surfaces to the CMC components. Sealing is extremely important in order to retain the advantage that CMC materials have of reduced cooling air.

One desirable use for the higher temperature material is a turbine shroud. However, various problems are known to exist with the supporting metallic hardware (shroud hanger). For example, some assemblies utilize a one-piece hanger construction that is deflected apart during the insertion of the shroud into a cavity of the shroud hanger. This interference at assembly is required to maintain sealing throughout the engine cycle and is due to the difference in coefficient of expansion of the metallic hanger and the CMC shroud. However, this mechanical deflection may cause bending or even yielding of the hanger arms during positioning of the shroud which is undesirable and may cause premature deformation and leakage at high temperature. Therefore, it would be desirable to have an assembly which is more easily assembled and will not cause yielding of the hanger.

It would be desirable to provide a hanger which is more easily assembled in forming the shroud hanger assembly. It would also be desirable to reduce hanger stresses in order to better thermally match the hanger and the shroud while reducing preload requirements of the hanger walls.

Additional concern with the use of low coefficient of thermal expansion materials is due to the differing rates of thermal expansion encountered with the differing materials. According to some attempts in utilizing these materials in combination with a metallic hanger, it is shown that the differing growth rates due to thermal expansion result in misalignment of the shroud or undesirable movement of the shroud within the hanger at high temperature conditions. This may additionally lead to unintended loosening of components at the higher operating temperatures and associated thermal growth. It would be desirable to control movement of the shroud relative to the shroud hanger in such a way that the shroud hanger does not become mispositioned within the hanger or hanger assembly.

It would further be desirable to overcome these and other deficiencies and provide a hanger assembly which better manages thermal differential between the shroud and the hanger materials.

The information included in this Background section of the specification, including any references cited herein and any description or discussion thereof, is included for technical reference purposes only and is not to be regarded subject matter by which the scope of the invention is to be bound.

SUMMARY

A shroud hanger assembly is provided for hangers and shrouds defining dimensionally incompatible components such as those which are press or frictionally fit to engage one another. The shroud hanger assembly includes a multi-piece hanger and a shroud which is pinned to the hanger assembly by at least one axially extending pin and which locates the shroud relative to the hanger to control motion in one or both of circumferential (tangential) and radial directions relative to the engine.

According to some embodiments, a shroud and hanger assembly comprises a shroud hanger formed of a first metallic material having a relatively higher thermal coefficient of expansion, the shroud hanger has a forward hanger portion and a rearward hanger portion, the shroud hanger having a cavity between the forward and rearward hanger portions, a shroud formed of a second material having a relatively lower coefficient of thermal expansion compared to the first material, the shroud being disposed within the cavity between the forward hanger portion and the rearward hanger portion, at least one axially oriented pin extending between at least a portion of the shroud hanger and the shroud.

According to another embodiment, a shroud assembly comprises a forward shroud wall and an aft shroud wall spaced from the forward shroud wall, a shroud base extends between the forward shroud wall and the aft shroud wall, the shroud base also defines a flowpath for combustor gas. A first angled portion on the forward shroud wall and a second angled portion on the aft shroud wall, and, the first and second angled portions providing radial support for the shroud.

According to a still further embodiment shroud support assembly comprises a forward shroud wall and an aft shroud wall spaced from the forward shroud wall, a shroud base extending between the forward shroud wall and the aft shroud wall, and, a leading edge overhang and trailing edge overhang extending forward and aft of the forward and aft shroud legs.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the structures and methods may be gleaned from the disclosure herein. A more extensive presentation of features, details, utilities, and advantages of the present invention is provided in the following written description of various embodiments of the invention, illustrated in the accompanying drawings, and defined in the appended claims. Therefore, no limiting interpretation of the summary is to be understood without further reading of the entire specification, claims and drawings included herewith.

BRIEF DESCRIPTION OF THE ILLUSTRATIONS

The above-mentioned and other features and advantages of these embodiments, and the manner of attaining them, will become more apparent and the embodiments will be better understood by reference to the following description taken in conjunction with the accompanying drawings, wherein:

FIG. 1 side section view of an exemplary gas turbine engine;

Figure 13:
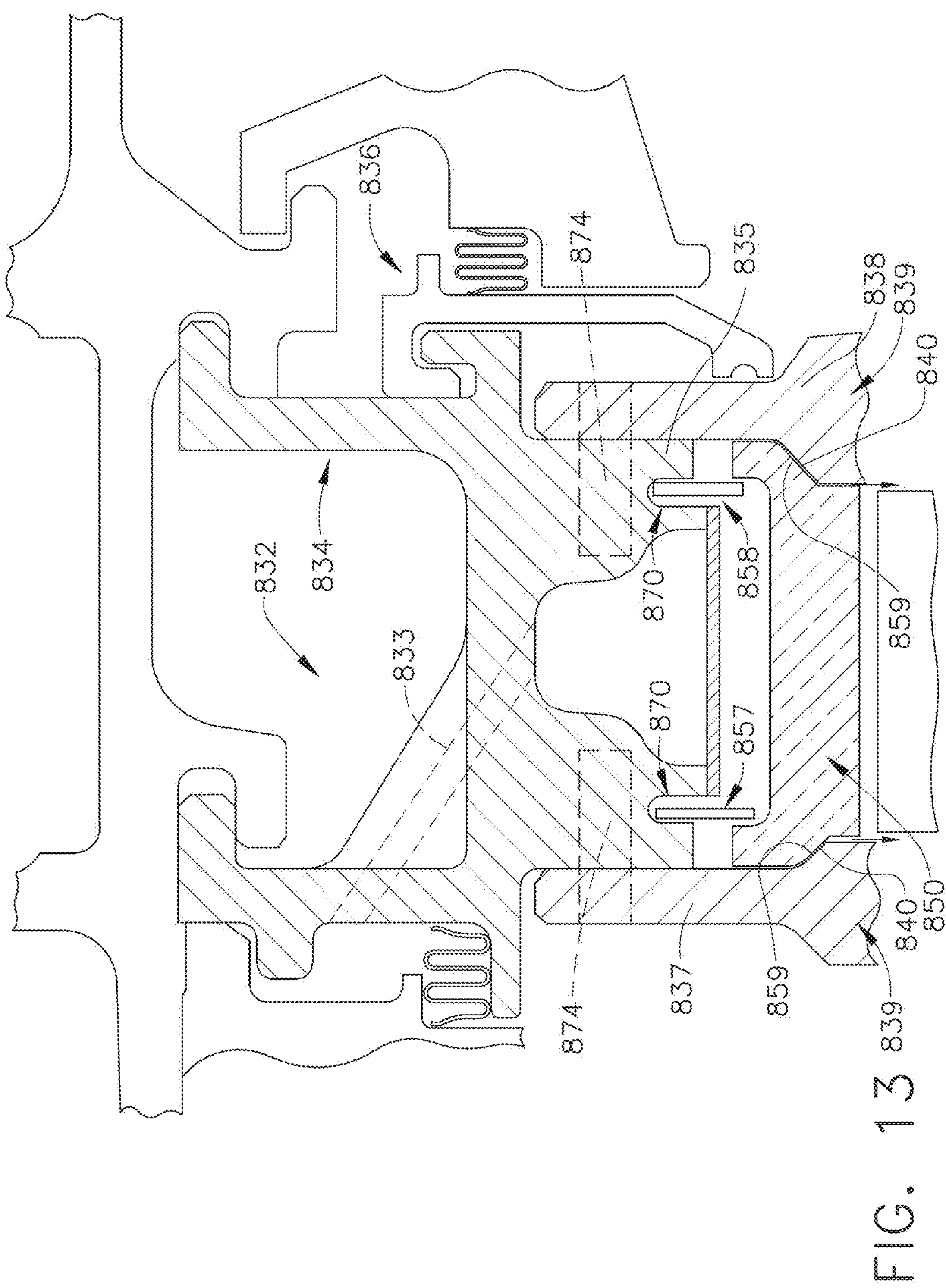
Figure 14:
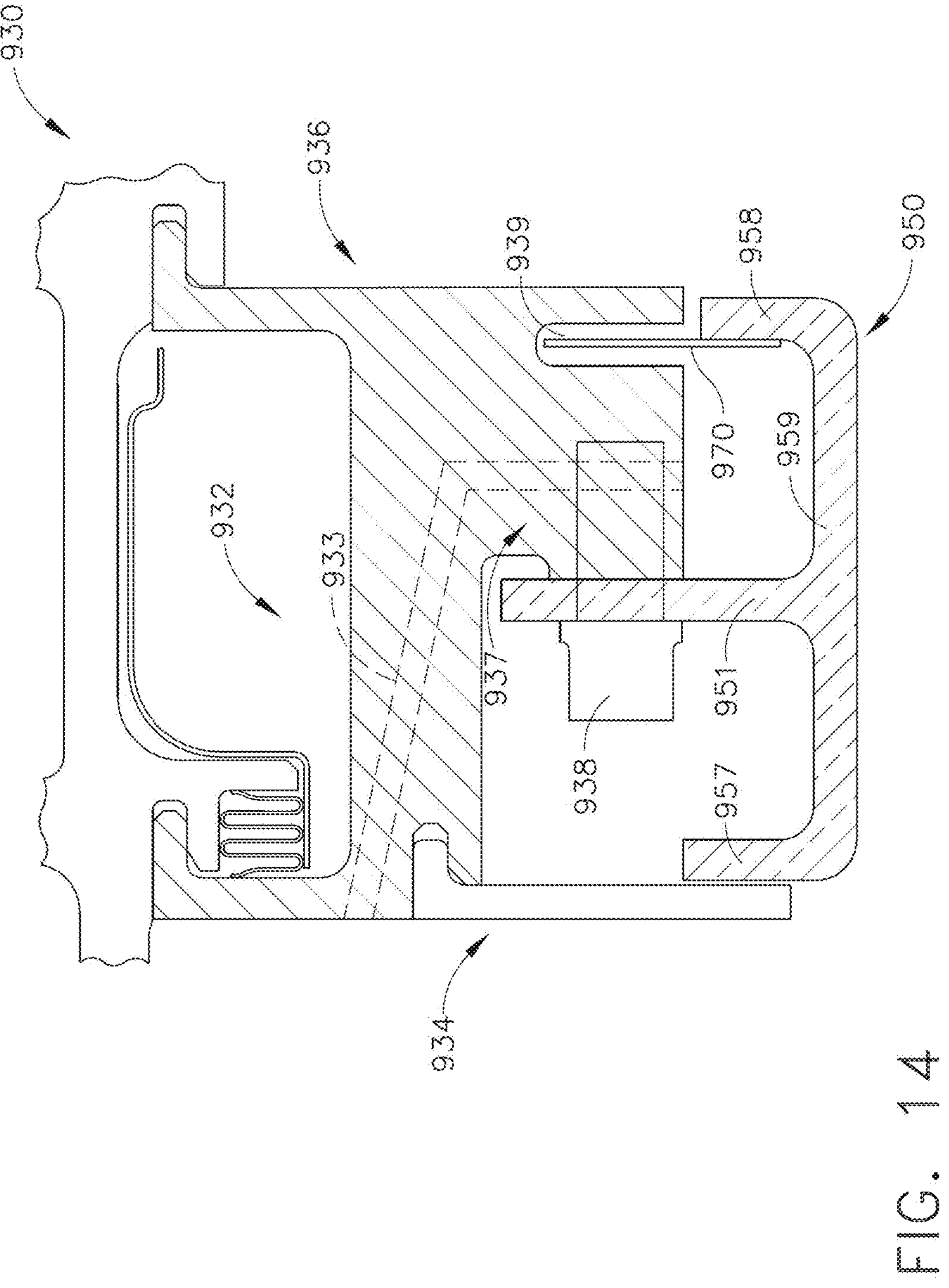

FIG. 13 an alternate embodiment of a shroud hanger assembly formed of multiple pieces; and, FIG. 14 an alternate embodiment of a shroud hanger assembly.

DETAILED DESCRIPTION

It is to be understood that the depicted embodiments are not limited in application to the details of construction and the arrangement of components set forth in the following description or illustrated in the drawings. The depicted embodiments are capable of other embodiments and of being practiced or of being carried out in various ways. Each example is provided by way of explanation, not limitation of the disclosed embodiments. In fact, it will be apparent to those skilled in the art that various modifications and variations may be made in the present embodiments without departing from the scope or spirit of the disclosure. For instance, features illustrated or described as part of one embodiment may be used with another embodiment to still yield further embodiments. Thus it is intended that the present disclosure covers such modifications and variations as come within the scope of the appended claims and their equivalents.

Embodiments of a shroud hanger assembly are depicted in FIGS. 1-14. The hanger assembly includes a multi-piece hanger with a shroud located within a cavity of the hanger. The shroud and hanger assembly are joined together with at least one axial pin to locate the position of the shroud relative to the hanger assembly. The axial pin may join the hanger portions or the combination of hanger and shroud.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the engine nozzle, or a component being relatively closer to the engine nozzle as compared to another component.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component.

As used herein, the terms "lateral" or "laterally" refer to a dimension that is perpendicular to both the axial and radial dimensions.

All directional references (e.g., radial, axial, proximal, distal, upper, lower, upward, downward, left, right, lateral, front, back, top, bottom, above, below, vertical, horizontal, clockwise, counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

Figure 1:
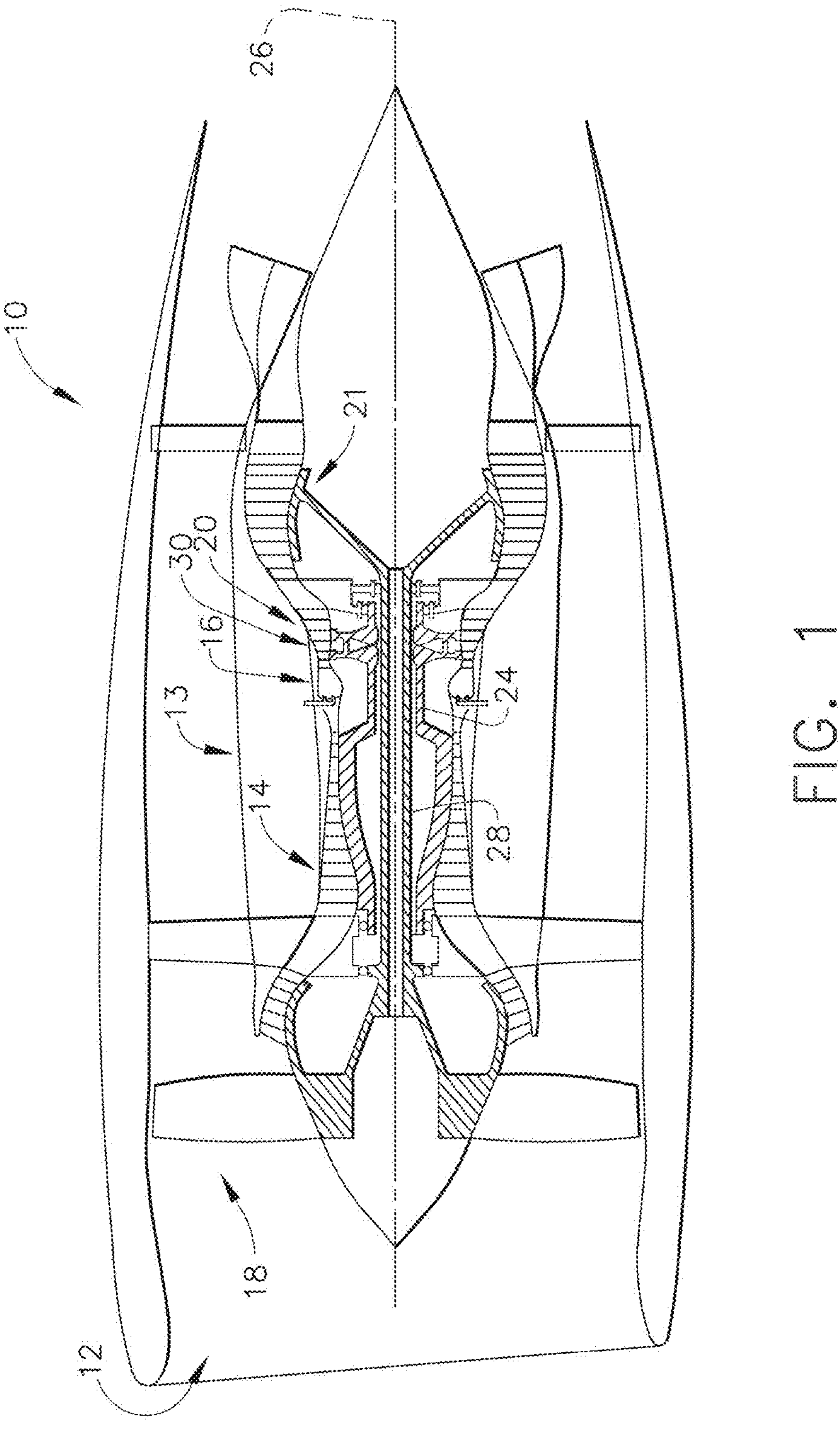

Referring initially to FIG. 1, a schematic side section view of a gas turbine engine 10 is shown. The function of the turbine is to extract energy from high pressure and temperature combustion gases and convert the energy into mechanical energy for work. The turbine engine 10 has an engine inlet end 12 wherein air enters the core or propulsor 13 which is defined generally by a compressor 14, a combustor 16 and a multi-stage high pressure turbine 20 all located along an engine axis 26. Collectively, the propulsor 13 provides power during operation. The propulsor 13 may be used for aviation, power generation, industrial, marine or the like.

In operation, air enters through the air inlet end 12 of the gas turbine engine 10 and moves through at least one stage of compression where the air pressure is increased and directed to the combustor 16. The compressed air is mixed with fuel and burned providing the hot combustion gas which exits the combustor 16 toward the high pressure turbine 20. At the high pressure turbine 20, energy is extracted from the hot combustion gas causing rotation of turbine blades which in turn cause rotation of the shaft 24. The shaft 24 passes toward the front of the engine to continue rotation of the one or more compressor stages 14, a turbofan 18 or inlet fan blades, depending on the turbine design. The turbofan 18 is connected by the shaft 28 to a low pressure turbine 21 and creates thrust for the gas turbine engine 10. The low pressure turbine 21 may also be utilized to extract further energy and power additional booster or low pressure compressor stages.

A shroud hanger assembly 30 may be utilized to define a flow path adjacent to rotating parts such as turbine blades 20, 21 or blades within a compressor 14. The shroud hanger assembly 30 is shown generically in the schematic FIG. 1 view. The assembly 30 may be disposed at a radially outward end of blades 22 (FIG. 2) of the turbine 20, 21, the combustor 16, or blades of the compressor 14.

Figure 2:
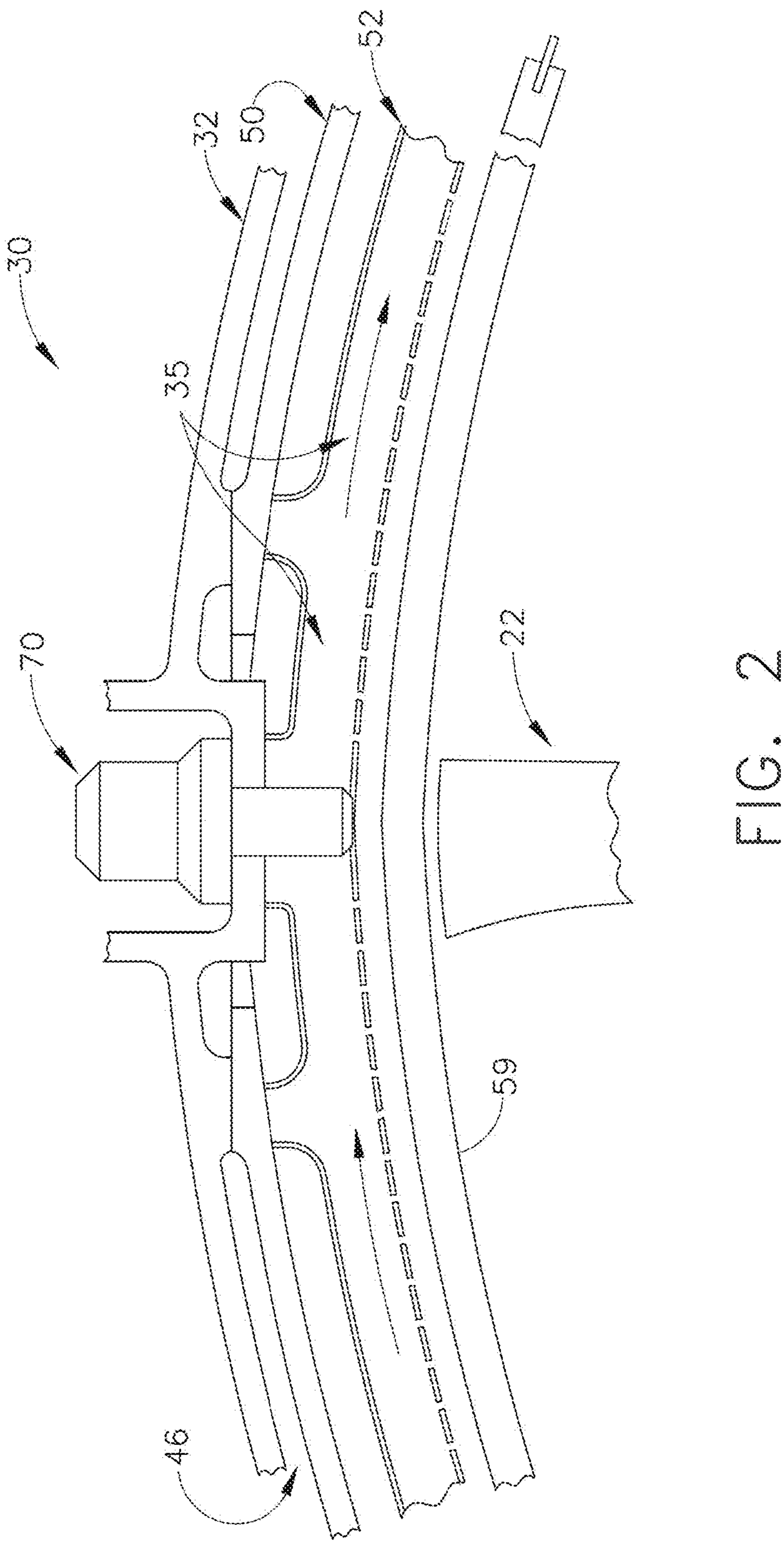
FIG. 2 is a circumferential cross-section of an exemplary hanger assembly.
Figure 3:
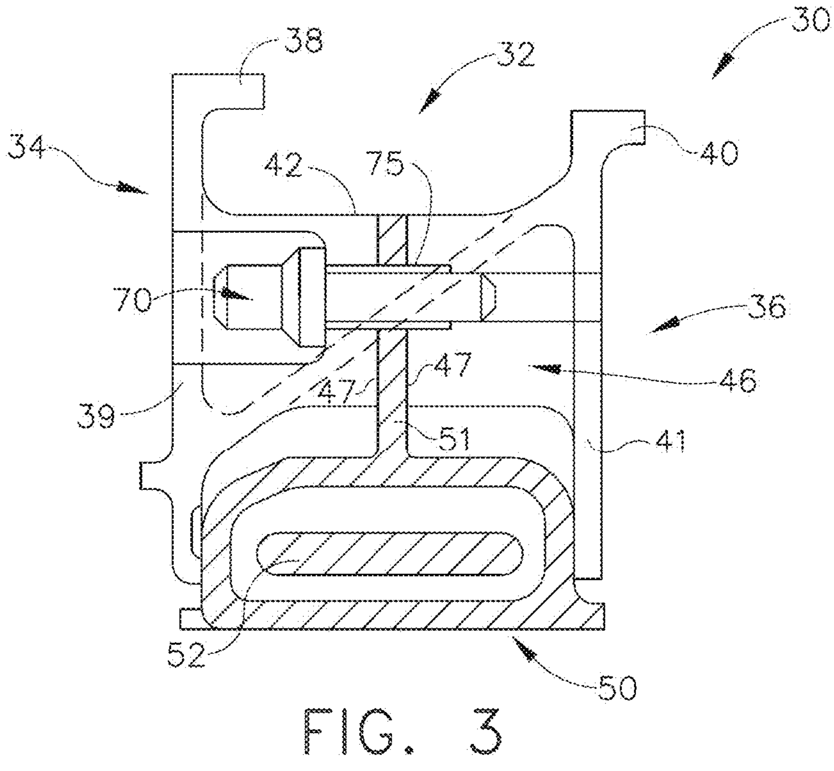
FIG. 3 is a cross-section view of an exemplary shroud hanger assembly.

Referring now to FIGS. 2 and 3, a circumferential cross-section of an exemplary hanger assembly 30 and a radial section view are shown. The assembly 30 includes a hanger 32 which may be formed of one or two hanger portions. The exemplary embodiments may include a first, or forward, hanger portion 34 and a second or rearward hanger portion 36 which are depicted in the cross-sectional view of FIG. 3. The assembly 30 further comprises a shroud 50 which is supported within a cavity 46 of the hanger 32. Specifically, the cavity 46 may be located between the hanger portions 34, 36. According to the instant embodiments, the hanger portions 34, 36 may be formed in the form of a one-piece hanger or a multi-piece hanger. The shroud 50 is retained between the hanger portions 34, 36 in an axial direction and has a lower surface 59 which defines an outer flow path for air moving adjacent to the blades of the rotating turbine 20, 21. As shown in the various embodiments, the shroud 50 may take various forms which are either open top shrouds or closed top shrouds.

The shroud 50 may be retained in position in various ways. According to some embodiments, a baffle 52 may be utilized wherein the baffle 52 is pinned to the hanger 32 and retains the shroud 50 in position. In a second method, a retainer may be utilized in combination with a pin structure. Alternatively, a combination of structures may be used.

A baffle 52 may be positioned interiorly of the shroud 50 and in flow communication with cooling apertures 35 extending through the hanger 32 so that the baffle 52 directs air over the inner surface of the shroud 50 providing impingement cooling thereof. A radial bolt 70 may be located through the hanger assembly 30. According to the depicted embodiment, the bolt or fastener 70 may connect to the baffle 52 and be utilized to retain the shroud 50 in position radially. Alternatively, a retainer may provide a radial retaining feature to capture the shroud 50 within the hanger 32. One skilled in the art will understand that the shroud 50 may be positioned in a variety of non-limiting manners.

The bolt 70 may be radial as shown to allow splitting of a hanger 32 in a radial direction allowing separation of portions in an axial direction. Alternatively, a bolt 70 may be disposed in the hanger to extend in the axial direction. The bolt 70 may connect two or more portions of the hanger 32 and tighten the hanger portions together.

In addition to the one or more bolts 70, and according to some embodiments, a sleeve or a pin may be utilized. To differentiate between the structures, a bolt, for example bolt 70, is generally utilized to retain portions of the hanger 32 together in an axial or radial direction. Alternatively, a pin or sleeve, for example sleeve 75 and pin 674 (FIG. 9) may be used to locate and/or guide relative movement between the hanger and shroud due to differences in thermal expansion. A pin is a solid structure that may, for example, be press fit through the hanger 32 to engage and locate a shroud or alternatively guide movement of one of the hanger or the shroud. A sleeve, for example sleeve 75, is a hollow structure which also guides relative movement of the hanger relative to the shroud. In the embodiment depicted, the sleeve 75 allows for passage of the bolt 70 therethrough. The sleeve 75 may be inserted through the hanger 32 and a bolt 70 passes through the sleeve 75 to retain the shroud 50 to the hanger 32. The pins may extend in the axial direction from forward to aft or from aft to forward. Additionally, pins may be used to locate the shroud 50 relative to the hanger 32 and guide relative movement between the hanger 32 and shroud 50.

The hangers described further herein may comprise one-piece hangers or may comprise multi-piece constructions. The multi-piece constructions may be connected in the axial direction or may be connected in the radial direction. Additionally, the engine casing may be utilized to capture one or both of the hanger portions 34, 36 in order to aid in building the assembly 30. Either or both of the first and second hanger portions 34, 36 may include one or more tabs 38, 40 for connecting the hanger 32 to the engine casing. A variety of arrangements may be utilized to define the multi-piece hanger 32 and the exemplary embodiment is merely one such embodiment which may be utilized in combination with additional embodiments shown herein. Accordingly, the exemplary hanger 32 should not be considered limiting as other forms of single or multi-piece hangers may be substituted and are to be considered within the scope of the instant disclosure. For example, according to some embodiments, the hanger 32 may be split 47 centrally or otherwise when viewed in a circumferential direction.

Depending from the tabs 38, 40 are legs 39, 41. The legs 39, 41 may depend radially, at an angle to a radial direction or some combination. The legs 39, 41 may be of equivalent length or one leg may be longer than the other. A web 42 is depicted extending between the first leg 39 and the second leg 41. The web, first leg and second leg 42, 39, 41 may all be formed of one of the first and second hanger portions 34, 36 or alternatively, may be formed of either of the first hanger portion 34 or second hanger portion 36. The web 42 may extend in an axial direction or alternatively, may be angled from the forward leg 39 to the aft leg 41 or some combination depending on the circumferential location along the web 42. Thus, this configuration may vary within a single part depending on where the section of the part is taken. Between these legs 39, 41 is the cavity 46 wherein the shroud 50 is positioned. The shroud 50 may be formed of a low coefficient of thermal expansion material which differs from that of the hanger 32. According to some exemplary embodiments, the hanger 32 may be formed of a metallic material such as an alloy which has a relatively higher coefficient of thermal expansion than the material of the shroud 50 which has a relatively lower coefficient of thermal expansion. For example, the shroud 50 may be formed of ceramic matrix composite material (CMC) but is not limited to such embodiment. Accordingly, during operation, the hanger 32 will grow at a thermal rate which is greater than that of the shroud 50. The shroud 50 may take various forms according to the embodiments described herein. For example, the shroud 50 may be a closed top shroud as depicted, meaning the upper portion of the shroud is generally closed. Such closed top may be horizontal, angled, a combination, curvilinear or other forms to substantially close the shroud 50. Alternatively, the shroud 50 may comprise an open top shroud which may be generally u-shaped according to other embodiments or other such shapes in which the top of the shroud is open rather than closed.

The embodiments may further utilize a pin, for example pin 274 (FIG. 4), to locate the shroud 50 relative to the hanger 32. The pins may take various forms including square and circular cross-sections. The pin may extend axially through one or both of the forward and aft portions of the hanger 32 through the shroud 50 to radially locate the shroud 50 within the hanger 32. The axial pin may extend directly through the shroud and hanger or may extend through one or more aligned sleeves 75 in the forward and aft ends of the hanger 32. The sleeves 75 may be of same or differing diameters. According to the instant embodiment, the locating pins may extend from the forward to the aft direction or in an opposite aft to forward direction. In the instant embodiment, the bolt 70 extends through a tab 51 which extends radially from the closed top of the shroud 50. As will be shown in the various embodiments herein, the structures for attaching the shrouds and pins may extend from forward, central and aft locations along the shrouds. In the instant embodiment, tab 51 is extending from a central location of the shroud 50.

Figure 4:
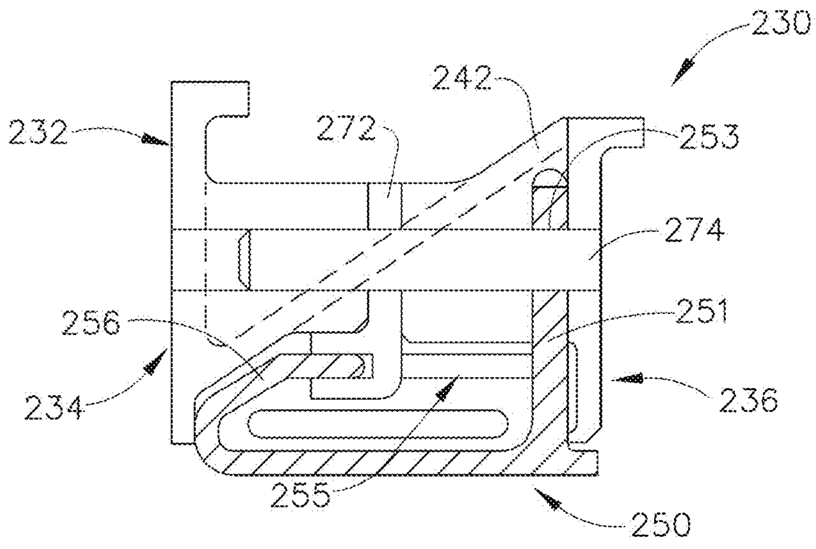
FIG. 4 is a section view of an alternate shroud hanger assembly.

Referring now to FIG. 4, a section view of an alternate hanger assembly 230 is depicted. The assembly 230 includes a hanger 232 having a first hanger portion 234 and a second hanger portion 236. A web 242 extends between the forward and aft ends of the hanger 232. The present embodiment utilizes axial pin 274 to extend through the hanger 232 and the shroud 250. The pin 274 guides relative movement of the hanger 232 relative to the shroud 250 or locates the shroud 250 relative to the hanger 232. As described further herein, the function of locating or guiding is dependent in part upon the shape of the aperture in the shroud 250. The shroud 250 includes a projection or a tab 251 which includes or aperture 253 through which pin 274 extends. The projection or tab 251 extends in a radial direction upwardly and is adjacent to an opening 255 passing through an upper surface 256 of the shroud 250. Accordingly, the projection 251 receives the pin 274 to hold the shroud 250 in a radial position while guiding relative movement and/or locating the shroud 250 within the hanger 232.

Figure 5:
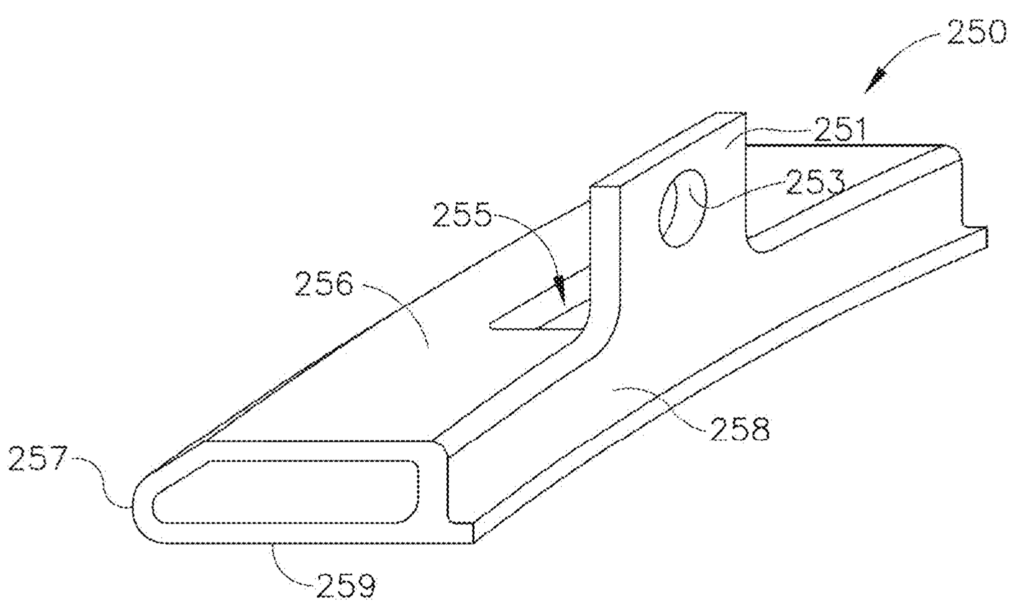
FIG. 5 is an isometric view of an exemplary shroud removed from the hanger assembly.

Referring now to FIG. 5, the shroud 250 is shown in isometric view removed from the hanger assembly 230 (FIG. 4). The shroud 250 has a top wall 256 including an opening 255 through which a retainer 272 (FIG. 4) or other retaining mechanism may be positioned. In addition to the shroud, the retainer 272 is also captured in the instant embodiment. Extending from the top wall 256 and adjacent to the opening 255 is the projection 251 including a pin aperture or hole 253. The shroud 250 may include a forward wall 257 and an aft shroud wall 258 as well as a lower wall 259 extending between the forward and aft walls 257, 258. The lower wall 259 may extend beyond the aft wall 258 to define a shoulder for a portion of the hanger 232 as depicted in FIG. 4.

In the exemplary embodiment, the top wall 256 extends to the circumferential end or slash face of the shroud 250. The embodiment depicted defines a closed top shroud 250 as previously described. However, alternate embodiments described further herein may include open top shrouds as well.

The shroud 250 may extend in a circumferential direction the full length of the hanger 232 or in an alternative embodiment, the shroud 250 may define one half of the length of a hanger 232 such that two shrouds are utilized with each hanger assembly 230.

Figure 6:
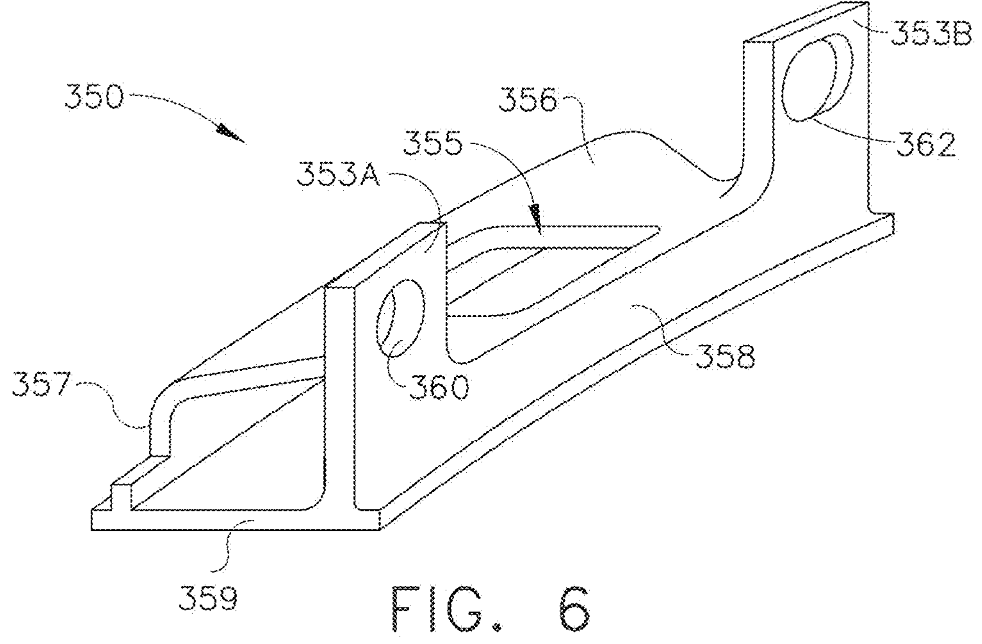
FIG. 6 is an isometric view of one alternate shroud embodiment.

Referring now to FIG. 6, an alternate shroud 350 is depicted. The shroud 350 includes an aft wall 358 and a forward wall 357 extending from a shroud base 359. An upper wall 356 extends between the forward wall 357 and the aft wall 358. The upper or top wall 356 includes an opening 355 for positioning of a retainer to provide a point of contact and support for the shroud 350, for example from beneath the top wall 356. Further, the embodiment includes tabs 353A, 353B at or near circumferential ends of the structure. This provides two additional points of contact for a total of three points of contact for the shroud 350.

The tab 353A includes a pin aperture 360 which receives a locating pin or sleeve 374. The aperture 360 is sized to receive a pin or sleeve therethrough and locate the shroud 350 with respect to a first pin.

The second tab 353B includes a slot 362 which is oversized in a circumferential or tangential direction to allow for movement of the shroud 350, for example due to thermal expansion, in the circumferential or tangential direction. Thus, the instant embodiment differs from the previous embodiment in that the structure utilizes two pins or sleeves, one functioning as a locating pin and the second functioning as a guide pin for movement in a circumferential direction. Thus, the circumferential growth of the shroud 350 is guided by the guide pin extending through slot 362. The tabs 353A, 353B are located at aft ends of the shroud 350 but may be at forward, central and rear ends or in between.

Figure 7:
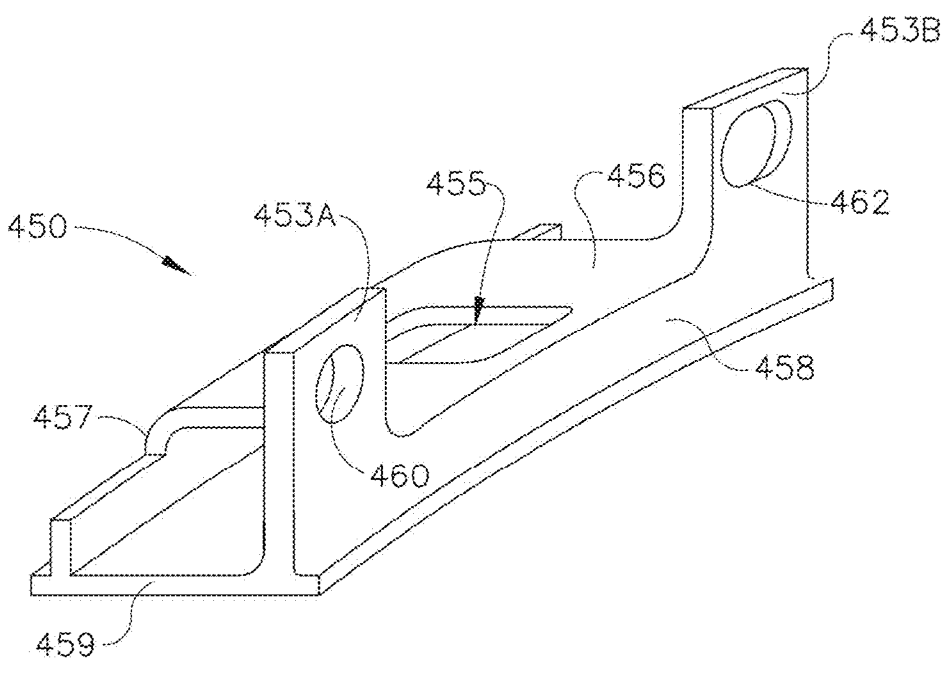
FIG. 7 is an isometric view of an alternate shroud.

Referring now to FIG. 7, an alternate embodiment of shroud 450 is depicted. The shroud 450 includes an upper or top surface 456, a base 459 and forward and aft walls 457,

458. The circumferential ends of the embodiment are similar to that of the embodiment FIG. 6 in that the top wall 456 does not extend to the slash face or circumferential end of the shroud 450. However the circumferential ends of the top wall 456 do not extend at an angle to the engine axial direction as in FIG. 6, but instead extend in the engine axial direction. Various cut-out shapes or openings 455 may be positioned or utilized to receive retaining structures for the shroud. Additionally, the shroud 450 includes a guide pin aperture 460 to locate the shroud 450 relative to the hanger and a slot 462 to control movement of the hanger relative to the shroud 450 through circumferential direction as previously described. The aperture and slot 460, 462 are located in the tabs 453A and 453B, respectively.

Figure 8:
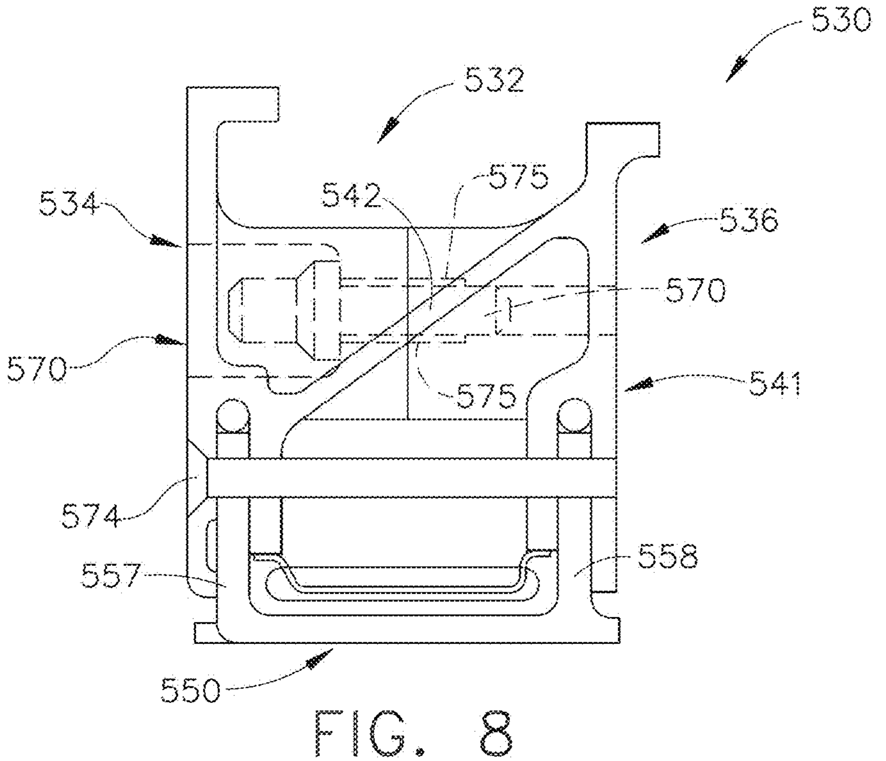
FIG. 8 is a side section view of an alternate shroud hanger assembly with an open top shroud.

Referring now to FIG. 8, a further embodiment is depicted wherein a shroud assembly 530 is shown in a section view. The assembly 530 includes a hanger 532 which may be formed of multiple pieces including a forward hanger portion 534 and an aft hanger portion 536 with a web 542 extending therebetween. The portions 534 and 536 are held together by an axial bolt 570 which passes through sleeve 575. The forward portion 534 and the aft portion 536 each include flange support 539, 541 which receive portions of a shroud 550. The instant embodiment comprises a shroud 550 which is of an open top embodiment comprising a forward leg 557 and an aft leg 558. The legs 557, 558 extend into the support 539, 541 respectively and one or more pins 574 form a connection that extends through the flange support 539 and flange support 541 so as to capture the shroud 550 therein. The one or more pins 574 extend in a forward and aft direction or may alternatively both extend in a forward direction or both extend in an aft direction.

Figures 9, 10:
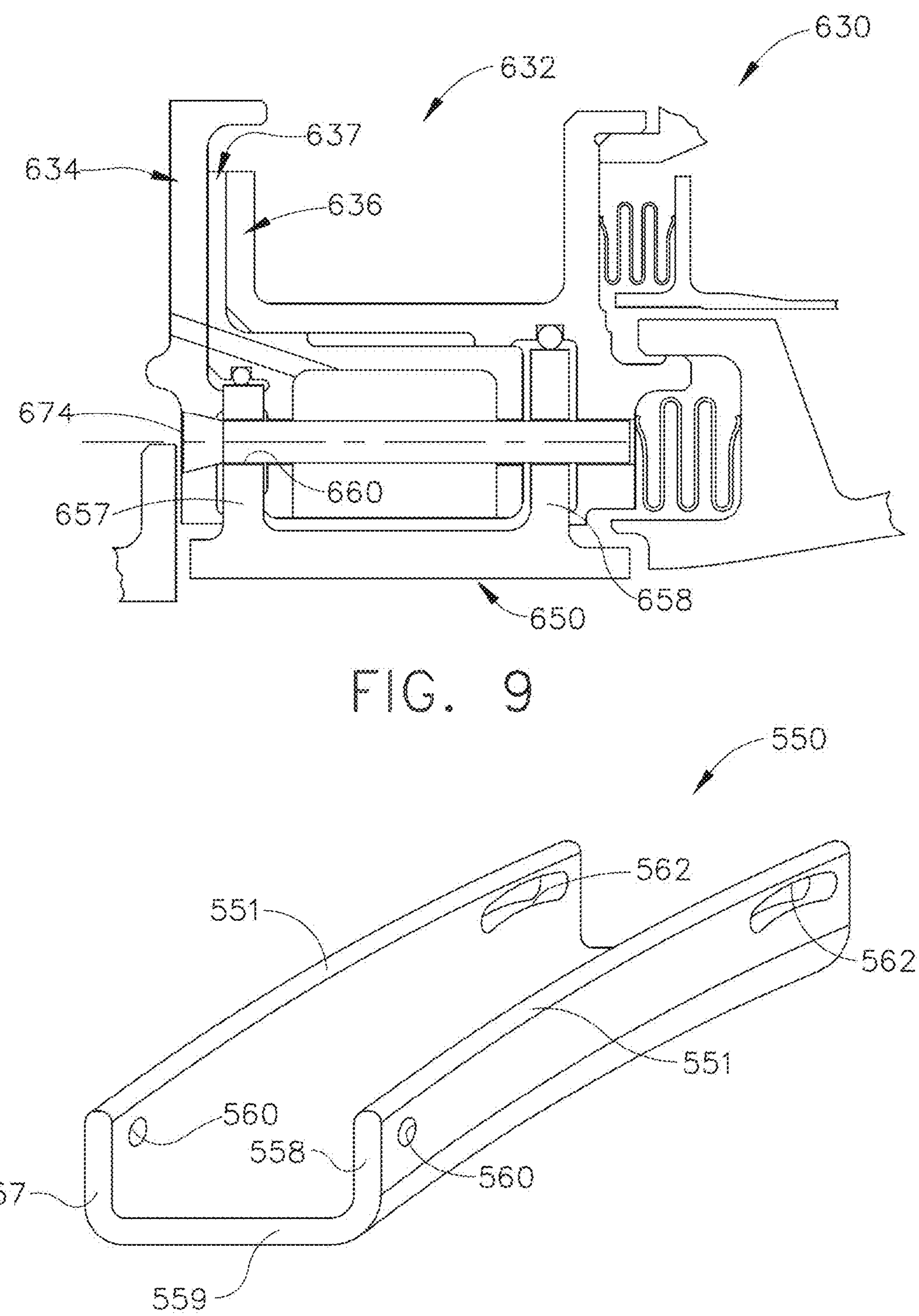
FIG. 9 is a side section view of an alternate embodiment of a shroud hanger assembly having a multi-piece hanger and an open top shroud.
FIG. 10 is an isometric view of an alternate embodiment of a shroud having an open top design.

Referring now to FIG. 9, an alternate embodiment of a hanger assembly 630 is depicted having a multi-piece hanger 632 and an open top shroud 650. According to the instant embodiment, the hanger 632 includes a first hanger portion 634 and an aft or second hanger portion 636. The second aft portion is biased in a forward direction toward the forward portion 634 by a seal, such as a conformal seal. A third hanger portion 637 is shown in this embodiment and a portion of which is sandwiched between the upper legs of the first and second portions 634, 636. The multiple portions of the hanger 632 sandwich the forward and aft legs 657, 658 of the shroud 650 and allow for pinned connection by way of axial pins 674 extending through the hanger 632 and shroud 650.

The shroud 650 is U-shaped in cross section and may include first and second walls 657, 658 which are formed of differing radially lengths. In other embodiments such as FIG. 10, the walls may be of equal lengths. Additionally, the shroud 650 includes an aperture 660 for receiving a sleeve and/or pin.

Referring now to FIG. 10, an isometric view of the shroud 550 is shown. The shroud 550 is generally U-shaped in section or end view including a first wall 557 and a second wall 558. The embodiment is exemplary wherein the first wall 557 is a forward wall and the second wall 558 is an aft wall. A base 559 extends between the first and second walls 557, 558 defining the U-shape. In this embodiment, the first and second walls 557, 558 are radially extending or generally vertical as opposed to the angled walls of the subsequent embodiment. The U-shape is open along the top and extends circumferentially to define a segment. A plurality of these segments are aligned at slash faces to extend circumferentially about the engine 10.

Each wall 557 and 558 may include a locating pin aperture 560. The locating pin aperture 560 receives a pin which extends through the hanger 532 (FIG. 8) and locates hanger 532 radially. The apertures are shown positioned near ends of the shroud 550 to preclude rocking of the shroud 550 relative to the hanger 532 (FIG. 8). Additionally, oppositely spaced circumferentially along each wall 557, 558, a guide pin aperture 562 is located. The aperture 562 is elongated or oblong to allow for growth of the shroud 550 relative to the shroud 550.

The first wall and second wall 557, 558 may be of equivalent radial length as shown in FIG. 8 or may be of different radial lengths as shown in FIG. 9. Additionally, the base 559 may extend in axial directions some preselected distance beyond one or both of the walls 557, 558. This may aid in sealing the turbine flowpath in the axial directions relative to adjacent structures. The upper surfaces 551 of the shroud 550 may include seals when installed in the hanger 532 so as to preclude airflow around the hanger 532.

The open top cross sectional shape of the shroud 550 may be formed by a various high temperature capable or low coefficient of thermal expansion materials including, but not limited to, ceramic matrix composite (CMC) material. The CMC may be laid in plies in one or more directions to provide improved strength and producibility.

Figure 11:
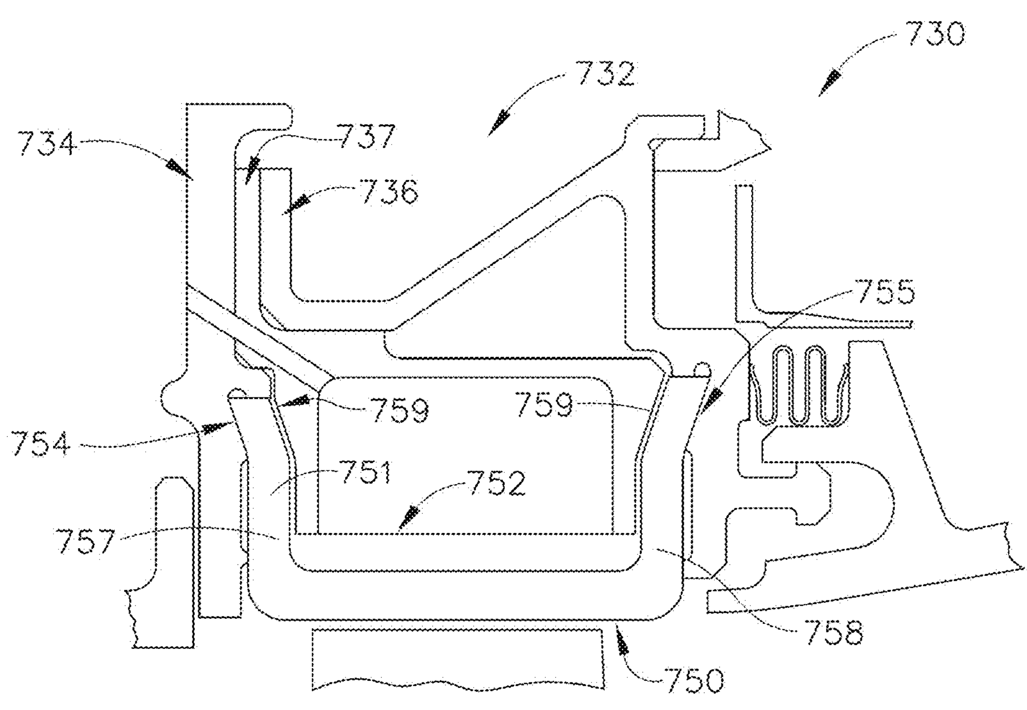
FIG. 11 is a side section view of a further alternate shroud hanger assembly.

Referring now to FIG. 11, a further alternate embodiment of a shroud hanger assembly 730 is depicted. The hanger assembly 730 includes a hanger 732 and a shroud 750, among other parts. The hanger 732 is defined by a first or forward hanger portion 734, a middle hanger portion 737 and a second or aft hanger portion 736. The hanger 732 therefore, is a three-piece configuration wherein the middle or third hanger portion 737 and the forward portion 734 clamp the shroud 750 in position. The shroud 750 includes at least one angled surface 751. According to the instant embodiment, the shroud 750 includes at least one angled portion 751 at the forward end and the aft end of the shroud 750. The forward hanger portion 734 and the middle hanger portion 737 each have corresponding angled surfaces 754 and 759. According to this embodiment, the angled surfaces of the hanger 732 and shroud 750 provide surfaces which can be machined to provide a seal between the assembly of the hanger 732 and the shroud 750. Additionally, the loading from the shroud 750 is spread across these engaging surfaces 754, 759 to improve functionality of the shroud 750. At the aft end of the assembly, aft hanger portion 736 also comprises an angled surface 755 which captures shroud 750 along with angled surface 759. Cooling apertures may extend through the hanger assembly 730 to pass to the interior of the middle portion 737 and pass through a baffle 752 for cooling of the interior surface of the shroud 750.

Figure 12:
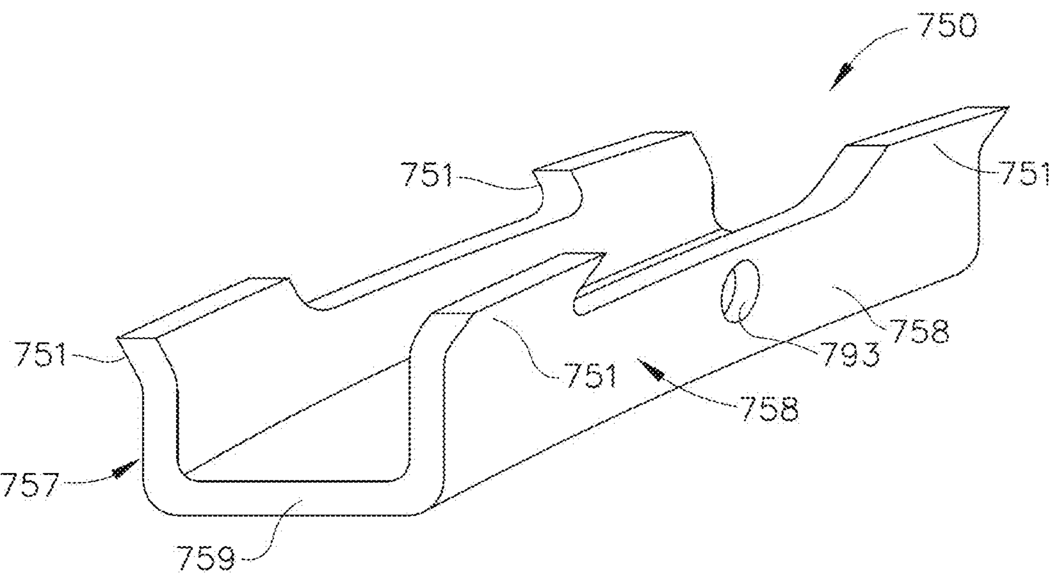
FIG. 12 is an isometric view of the shroud of FIG. 11 removed from the assembly.

Referring now to FIG. 12 the shroud 750 is shown removed from the hanger 732 (FIG. 11). The shroud 750 includes a forward wall 757, an aft wall 758 and a base 759 extending therebetween. At upper ends of the walls 757, 758 are angled surfaces 751. The present embodiment utilizes these angled surfaces 751 at circumferential ends of the shroud 750. However, these may be utilized elsewhere. Similarly, a pin aperture 793 is shown located on the aft wall 758 of the shroud 750. However, the pin aperture 793 may also be located on the forward wall 757 or may be moved from its central circumferential position to an alternate position as desired. Further, additional pin holes may be utilized.

Referring now to FIG. 13, a further embodiment of a shroud hanger assembly is depicted including a hanger 832 which is formed of multiple pieces including a first portion 834 and a second portion 836. In this embodiment, the hanger 832 is connected to an engine casing as in previous embodiments and the first and second portions 834, 836 are connected at the aft end of the hanger 832 wherein the second portion is generally connected in a radial direction defining a spring arm which acts against a shroud. According to alternative embodiments, the first and second portions of the hanger 834, 836 may be connected in other fashions such as in an axial direction as with previous embodiments.

Additionally, while the instant embodiment provides that the first hanger portion 834 is larger in mass and size and the second hanger portion 836 is smaller and defines a spring structure, opposite configurations may be utilized wherein the second portion 836 is of a larger size and the first portion 834 is of a smaller size.

The hanger 832 comprises a downwardly depending portion which is fastened to first and second shroud retainers 837, 838. These retainers define portions of the shroud 850 which is additionally positioned therebetween. The retainers 837, 838 extend at the forward end of the hanger 832 and at an aft end in a radial direction and comprise pedestals 839 from which the upwardly extending portions of the shroud retainers 837, 838 extend. Between the pedestals 839 is a central shroud 850 which is generally u-shaped having an angled wall 859 at forward and aft ends which engage angled surfaces 840 of the pedestals 839. This captures the shroud 850 in position between the retainers 837, 838.

The retainers 837, 838 may be connected in various fashions but according to the instant embodiment, pins 874 may be utilized which extend through the retainers 837, 838 and into the hanger 832. A low portion of the hanger 835 includes a flow through aperture 833 which extends from a forward end of the hanger 832 and allows for cooling air to access a cooled upper surface of the shroud 850. Since the shroud 850 includes multiple pieces and is spaced from the lower portion 835 a radial distance, leaf seals 857, 858 may be utilized to limit air leakage from between the shroud 850 and hanger 832, as well as preclude leakage which would otherwise pass between the shroud retainers 837 and 838 between the angled walls 859 and surfaces 840. The leaf seals 857, 858 are shown extending in a radial direction. The seals engage on a radially extending surface of the u-shaped shroud 850 and are fastened, adhered, connected or otherwise joined to one of the hanger 832 and the shroud 850. In the instant embodiment, pockets 870 are formed in the lower portion 835 of the hanger 832 and receive the upper ends of leaf seals 857, 858. The leaf seals are connected to the hanger 832 within these pockets 870. In the embodiment depicted, the pressure is greatest in the area between the lower hanger portion 835 and the shroud 850. This causes outward force or movement of the leaf seals 857, 858 or in an axial direction which causes the leaf seals to engage either or both of the hanger 832 and shroud 850. Similarly, the pressure above the shroud 850 is also greater than in the area at the forward end of a blade which is shown beneath the assembly 830. The pressure at the forward end of the blade is also greater than the pressure at the aft end of the blade. Accordingly, the pressure in this area of the blade will not force the leaf seals 857, 858 axially inward toward one another creating a leakage but instead, the internal pressure above the shroud 850 and in the area between the shroud 850 and the lower hanger portion 835 cause an axially outward force to seal this area of the assembly 830.

Referring now to FIG. 14, an alternate embodiment of a hanger assembly 930 is depicted. In the instant embodiment the hanger 932 includes a forward portion 934 and an aft portion 936 wherein the aft portion 936 is the large of the two bodies and the forward portion 934 is connected in an axial direction to a groove of the aft portion 936. As with previous embodiments, one or more cooling channels or apertures 933 may extend through the hanger 932 for cooling of a shroud 950 therebelow. The hanger 932 may take various forms as previously described wherein the first and second portions 934, 936 are of equivalent size or as depicted, wherein one size is greater than the other. Additionally, the hanger 932 may function wherein one of the hanger portions 934, 936 functions as a spring against a surface of the shroud 950 to retain the shroud in position.

The shroud 950 of the instant embodiment is an open top shroud, similarly to the previous type which was u-shaped. In this embodiment, the shroud 950 has a w-shape including a forward shroud portion 957, an aft shroud portion 958 and a shroud base 959 which extends between the two parts. A central arm 951 extends upwardly from the base 959 and is bolted for example, by a fastener 938 to a retainer 937 which is connected to the hanger 932. Specifically, the retainer 937 depends from the second shroud portion 936. The shroud 950 is sealed by a leaf seal 970 which extends between the aft shroud portion 958 and a slot or pocket 939 of the second shroud portion 936. The leaf seal 970 may be connected to either of the shroud 950 or the hanger 932, within the slot or pocket 939, so as to provide for insertion of the leaf seal 970 in a radial direction between the shroud 950 and hanger portion 936. The seal 970 may be connected as in previous embodiments to either of the shroud 950 or the hanger 932 and while the leaf seal 970 is shown extending in a radial direction, such leaf seal 970 may also extend at angles to the radial direction and further extend in the circumferential direction of the engine.

The pressure between the hanger 932 and shroud 950 is greater than the pressures at the forward end of the blade and the aft end of the blade. Therefore, the pressure in this area between the shroud 950 and the hanger 932 will force the leaf seal 970 in an axially outward direction against the adjacent components and preclude air leakage between the parts. Alternatively stated, since this pressure between the shroud 950 and hanger 932 is greater, the leaf seal 970 will not be forced in an axially forward direction which would allow leakage to back flow into the area between the shroud 950 and the second hanger portion 936.

The foregoing description of several embodiments of the invention has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

What is claimed is:

1. A shroud hanger assembly comprising:
- a hanger having a first portion and a second portion; and
- a shroud; and
- the first portion is fastened to a portion of the shroud, the first portion and a first end of the second portion being connected at an aft end of the shroud, and the second portion of the hanger defining a spring arm wherein a second end of the second portion opposite the first end acts against the shroud to retain the shroud.

2. The shroud hanger assembly of claim 1, wherein the first and the second portions of the hanger are radially connected at the aft end of the shroud.

3. The shroud hanger assembly of claim 1, wherein the shroud is retained between a first shroud retainer and a second shroud retainer.

4. The shroud hanger assembly of claim 3, wherein the first portion of the hanger is fastened to the first shroud retainer and the second shroud retainer by respective pins.

5. The shroud hanger assembly of claim 4, wherein the respective pins are axially oriented.

6. The shroud hanger assembly of claim 3, wherein the first shroud retainer has an angled surface that engages a first angled surface of the shroud and the second shroud retainer has an angled surface that engages a second angled surface of the shroud.

7. The shroud hanger assembly of claim 3, wherein the first shroud retainer includes a first pedestal and a first upwardly extending portion extending from the first pedestal, and the second shroud retainer includes a second pedestal and a second upwardly extending portion extending from the second pedestal.

8. The shroud hanger assembly of claim 7, wherein the shroud further comprises a first angled wall engaging the first pedestal and a second angled wall engaging the second pedestal.

9. The shroud hanger assembly of claim 1, wherein the hanger defines flow through aperture that extends from a forward end of the hanger and allows for cooling air to access the shroud.

10. The shroud hanger assembly of claim 1, further comprising a leaf seal, wherein the leaf seal engages a radially extending surface of the shroud and is joined to one of the hanger and the shroud, the hanger defining a pocket in which the leaf seal is received.

11. The shroud hanger assembly of claim 10, further comprising a second leaf seal, wherein the second leaf seal engages a second radially extending surface of the shroud and is joined to one of the hanger and the shroud, the hanger defining a second pocket in which the second leaf seal is received.

12. The shroud hanger assembly of claim 10, wherein the shroud is spaced from the hanger by a radial distance, and the leaf seal extends in a radial direction across the radial distance.

13. The shroud hanger assembly of claim 10, wherein the shroud and the hanger define an area therebetween, and the leaf seal is arranged to receive an outward axial force from pressure in the area.

14. The shroud hanger assembly of claim 1, wherein the shroud is an open top construction.

15. The shroud hanger assembly of claim 1, wherein the shroud has a forward wall, an aft wall, and a base extending between and connecting the forward wall and the aft wall.

16. The shroud hanger assembly of claim 1, wherein the first portion of the hanger is larger than the second portion of the hanger.

17. The shroud hanger assembly of claim 1, wherein the first portion defines a cavity and the second portion is disposed in the cavity.

18. The shroud hanger assembly of claim 17, wherein the second portion extends radially inward into the cavity.

19. The shroud hanger assembly of claim 1, wherein the shroud is U-shaped.

20. The shroud hanger assembly of claim 1, wherein the spring arm extends axially from the first portion of the hanger to the aft end of the shroud.

* * * * *